US005359612A

United States Patent [19]
Dennis et al.

[11] Patent Number: 5,359,612
[45] Date of Patent: Oct. 25, 1994

[54] HIGH REPETITION RATE, MODE LOCKED, FIGURE EIGHT LASER WITH EXTRACAVITY FEEDBACK

[75] Inventors: Michael L. Dennis, Alexandria; Irl N. Duling, III, Round Hill, both of Va.

[73] Assignee: The United States of America as represented by the Secretary of the Navy, Washington, D.C.

[21] Appl. No.: 128,187

[22] Filed: Sep. 29, 1993

[51] Int. Cl.$^5$ ............................................. H01S 3/07
[52] U.S. Cl. ............................ 372/18; 372/6; 372/21; 372/30; 372/94; 385/11; 385/24
[58] Field of Search ............... 356/350; 372/6, 18, 372/20, 21, 22, 30, 75, 94; 385/11, 15, 24, 27, 30, 122

[56] References Cited

U.S. PATENT DOCUMENTS

| | | | |
|---|---|---|---|
| 5,050,183 | 9/1991 | Duling, III | 372/94 |
| 5,090,017 | 2/1992 | Mendenhall et al. | 372/6 |
| 5,093,833 | 3/1992 | Pang et al. | 372/30 |
| 5,119,383 | 6/1992 | Duliong, III et al. | 372/18 |
| 5,132,983 | 7/1992 | Behfar-Rad | 372/94 |
| 5,208,455 | 5/1993 | Nelson et al. | 356/350 X |

OTHER PUBLICATIONS

E. Yoshida et al., "Laser Diode-Pumped Femtosecond Erbium-Doped Fiber Laser with a Sub-Ring Cavity for Repetition Rate Control", Appl. Phys. Lett. 60(8), pp. 932-934, 24 Feb. 1992.

M. Nakazawa et al., "Low Threshold, 290 fs Erbium-Doped Fiber Laser with a Nonlinear Amplifying Loop Mirror Pumped by InGaAsP Laser Diodes", Appl. Phys. Lett. 59(17), pp. 2073-2075, 21 Oct. 1991.

R. P. Davey et al., "Interacting Solitons in Erbium Fibre Laser" Electronics Letters, vol. 27, No. 14, pp. 1257-1259, 4 Jul. 1991.

M. L. Dennis and I. N. Duling III, "High Repetition Rate Figure Eight Laser with Extracavity Feedback", Electronics Letters, vol. 28, No. 20, pp. 1894-1896 plus 3 additional pages, 24 Sep. 1992.

Primary Examiner—John D. Lee
Attorney, Agent, or Firm—Thomas E. McDonnell; George Jameson

[57] ABSTRACT

An optical pulse generator for producing mode-locked optical pulses comprises: a beam splitter; first and second optical loops coupled together by the beam splitter so as to define a figure eight optical path in which a light beam propagating toward the beam splitter in one of the first and second optical loops is split by the beam splitter to form two light beams propagating in opposite directions around the other one of the first and second optical loops; a direction dependent loss element disposed in the first optical loop for reducing the intensity of light propagating in a predetermined direction around the first optical loop; a nonlinear element disposed in the second optical loop and having an intensity dependent nonlinear optical transmission characteristic; an optical gain medium disposed in a selected one of the first and second optical loops; coupling apparatus for coupling pump light into the selected one of said first and second optical loops having the gain medium, and for coupling mode-locked optical pulses out of the optical pulse generator; and a feedback structure, coupled to the coupling apparatus, being responsive to light propagating therethrough for controlling the repetition rate of the mode-locked optical pulses.

25 Claims, 1 Drawing Sheet ial application of figure eight lasers is impeded by the low repetion rate of typical systems, and by operation with multiple mutually interacting pulses. To insure readily initiated, stable mode locking, switching fiber lengths of several meters have been yielding fundamental repetition rates on the order of 1-10 megahertz (MHz). The intracavity power for a single fundamental subpicosecond soliton at this repetition rate is insufficient to completely saturate the gain, so a number of pulses evolve within the cavity up to a limit imposed by the gain. These pulses usually form with arbitrary spacings, and interact strongly leading to erratic reconfiguration of the pulse train. Efforts to multiply the repetition rate and to control pulse interactions by harmonic mode locking have yielded stable 125 MHz pulse trains, but involved the use of intracavity bulk optic elements and an additional amplifier section to compensate for the concomitant loss.

HIGH REPETITION RATE, MODE LOCKED, FIGURE EIGHT LASER WITH EXTRACAVITY FEEDBACK

SPECIFICATION

1. Field of the Invention

The present invention relates to fiber laser generators of soliton pulses and more particularly to a figure eight fiber laser with extracavity feedback to obtain pulse shortening, initiation of mode locking, and repetition rate control.

2. Description of the Related Art

Over the past few years there has been considerable interest in mode-locked, erbium-doped fiber lasers as sources of ultra-short, chirp-free, soliton pulses for telecommunications and research applications. The development of so-called figure eight lasers (F8L) based on the nonlinear amplifying loop mirror (NALM) as a passive mode locker, and of related systems, has allowed the generation of subpicosecond pulses directly from all fiber lasers, with 290 femtosecond (fs) pulses reported for a semiconductor laser pumped-figure eight laser. Despite this progress, the practical application of figure eight lasers is impeded by the low repetion rate of typical systems, and by operation with multiple mutually interacting pulses. To insure readily initiated, stable mode locking, switching fiber lengths of several meters have been yielding fundamental repetition rates on the order of 1-10 megahertz (MHz). The intracavity power for a single fundamental subpicosecond soliton at this repetition rate is insufficient to completely saturate the gain, so a number of pulses evolve within the cavity up to a limit imposed by the gain. These pulses usually form with arbitrary spacings, and interact strongly leading to erratic reconfiguration of the pulse train. Efforts to multiply the repetition rate and to control pulse interactions by harmonic mode locking have yielded stable 125 MHz pulse trains, but involved the use of intracavity bulk optic elements and an additional amplifier section to compensate for the concomitant loss.

SUMMARY OF THE INVENTION

It is therefore an object of the invention to provide an optical pulse generator which controls the repetition rate of its output mode-locked optical pulses.

Another object of the invention is to provide a rare earth-doped, figure eight laser which utilizes the feedback of light, rejected by a nonlinear amplifying loop mirror, back into the laser to stabilize mode-locking, enhance startup, shorten the pulse length and multiply the repetition rate of the laser.

Another object of the invention is to provide an optical pulse generator which utilizes an adjustable feedback delay to readily initiate mode-locking in the optical pulse generator.

Another object of the invention is to provide a mode-locked fiber laser which utilizes the extracavity feedback of light to achieve pulse shortening, initiation of mode-locking and repetition rate control.

Another object of the invention is to provide a short optical pulse generator which is readily implemented as an all fiber device and which is compatible with conventional erbium amplifiers.

Another object of the invention is to provide a short optical pulse generator which is capable of soliton pulse generation.

A further object of the invention is to provide a passively mode-locked pulse laser utilizing a nonlinear feedback loop with low switching threshold.

These and other objects of this invention are achieved by providing an optical pulse generator for producing mode-locked optical pulses comprising: a beam splitter; first and second optical loops coupled together by the beam splitter so as to define a figure eight optical path in which a light beam propagating toward the beam splitter in one of the first and second optical loops is split by the beam splitter to form two light beams propagating in opposite directions around the other one of the first and second optical loops; a direction dependent loss element disposed in the first optical loop for reducing the intensity of light propagating in a predetermined direction around the first optical loop; a nonlinear element disposed in the second optical loop and having an intensity dependent nonlinear optical transmission characteristic; an optical gain medium disposed in a selected one of the first and second optical loops; coupling apparatus for coupling pump light into the selected one of said first and second optical loops having the gain medium, and for coupling mode-locked optical pulses out of the optical pulse generator; and a feedback structure, coupled to the coupling apparatus, being responsive to light propagating therethrough for controlling the repetition rate of the mode-locked optical pulses.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

Figure 1:
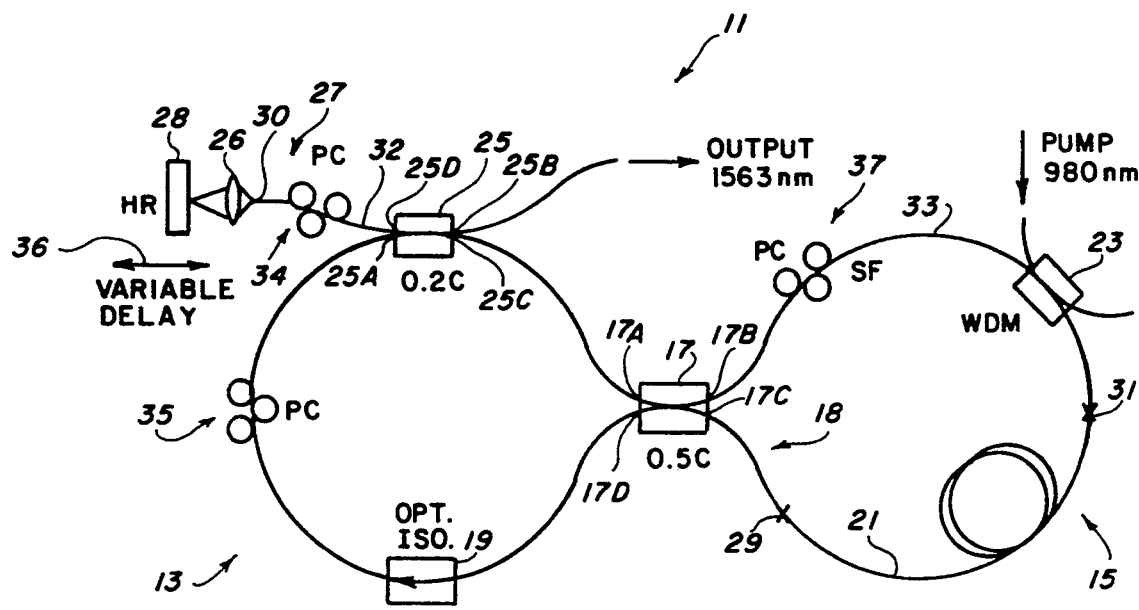
FIG. 1 illustrates a preferred embodiment of the invention.

Referring now to FIG. 1, an optical pulse generator or figure eight laser (F8L) 11 for producing short optical pulses is shown. The figure eight laser 11 comprises optical loops 13 and 15 coupled together by a beam splitter 17 so as to define a figure eight optical path in which a light beam propagating toward the beam splitter 17 in one of the optical loops 13 and 15 is split by the beam splitter 17 to form two light beams propagating in opposite directions around the other one of the optical loops 13 and 15. Optical loop 13 includes a direction dependent loss element or optical isolator 19 for substantially blocking or reducing the intensity of light propagating in an exemplary counterclockwise direction around the optical loop 13. The loop mirror 18 is configured to have an intensity dependent nonlinear optical transmission characteristic such that the transmission preferably increases with increasing intensity. An optical gain medium or element 21 is disposed in, for example, the optical loop 15. An optical coupling structure is provided for coupling pump light into the gain medium 21, and for coupling mode-locked optical pulses out of the figure eight laser 11. This optical coupling structure is preferably comprised of a pump coupler or wavelength division multiplexer coupler 23 disposed in the optical loop 15 that contains the gain element 21 for coupling pump light into that optical loop 15, and an output coupler 25 disposed in the optical loop 13 from which mode-locked optical pulses are coupled out of the optical pulse generator 11. A feedback structure or feedback arm 27 is coupled to the output coupler 25 and is responsive to light propagating through the output coupler for controlling the repetition rate of the mode-locked optical pulses. The feedback arm 27 comprises, for example, a lens 26 for coupling light to a mirror 28 from an end 30 of an optical fiber 32 which is coupled between the lens 26 and the output coupler 25. The feedback arm 27 may also include a polarization controller 34 formed in the optical fiber 32.

The gain medium 21 comprises a length of rare earth doped single-mode optical fiber which is, for example, asymmetrically connected into the optical loop 15 between splice positions 29 and 31, and preferably adjacent to the beam splitter 17. Preferably, an erbium (Er)-doped fiber, such as Type ER-2 manufactured by Corning Inc., is used to obtain soliton operation. Loss element 19 advantageously comprises a fiber optical isolator for effectively blocking light travelling in the reverse direction. However, it will be appreciated that an element 19 providing direction dependent attenuation of light travelling within optical loop 13 is sufficient. The parameters of the conventional WDM coupler 23 in optical loop 15 are selected according to the pump light source required for the type of gain medium 21 being used and the desired wavelength of the light to be generated within the figure eight laser 11; and the parameters of the beam splitter 17 are preferably selected so that the beam splitter 17 has a splitter ratio of 50:50 (0.5 C). The output coupler 25 is preferably a 20% splitter (0.2 C) at the output wavelength of the figure eight laser 11.

In the operation of the figure eight laser 11 in a soliton mode with erbium-doped fiber as the gain medium 21, the WDM coupler 23 is configured to couple all of the pump light at a 980 nanometer (nm) or 1.48 micrometer ($\mu$m) wavelength into the optical loop 15. Optical loop 15 comprises a predetermined length of optical fiber 33, which may be either polarization preserving or non-polarization preserving. Advantageously, standard telecommunications optical fiber (SF), such as Type SMF-28 manufactured by Corning, Inc., which has a zero dispersion wavelength of 1.3 $\mu$m and dispersion of 16 ps/nm-km, is employed as the fiber 33. In that case, optical loops 13 and 15 are respectively provided with conventional polarization controllers 35 and 37, as shown. Controllers 35 and 37 provide polarization compensation of the light beams entering beam splitter 17 for random birefringence present in a non-polarization preserving fiber. Controller 35 also permits compensation of the polarization shift which typically is produced by conventional optical isolators. Controller 37 can also be used to adjust the linear phase offset of counterpropagating light within the optical loop 15.

In the figure eight laser 11, the beam splitter 17 and optical loop 15 function as a nonlinear amplifying loop mirror (NALM) 18. As light propagates within the figure eight laser 11, light entering port 17A of beam splitter 17 from optical loop 13 is split equally by way of respective ports 17B and 17C of beam splitter 17 into clockwise (CW) and counterclockwise (CCW) propagating beams within optical loop 15. The CCW beam is amplified by gain medium 21 prior to propagating around optical loop 15, and the CW beam is amplified after propagating around the optical loop 15. The amplified CW and CCW beams return to beam splitter 17 at the same amplitude, but one beam has acquired a nonlinear phase shift relative to the other. This phase shift causes the high intensity portions of the beams to be transmitted through port 17D of beam splitter 17, while the low intensity portions tend to be reflected back through port 17A of beam splitter 17 in the direction that the beams entered beam splitter 17. The optical isolator 19 favors the transmission and amplification in the NALM 18 of the high intensity portions of the light, resulting in mode-locking of the figure eight laser 11 and shortening and amplification of the generated pulses each time they pass through the NALM portion 18 of the figure eight laser 11.

If the sign of the overall average dispersion within the figure eight laser 11 for one round trip is such that the pulse broadening due to linear dispersion can be compensated by that of nonlinear dispersion (self-phase modulation), then the pulses generated by the figure eight laser 11 exist as solitons. This is accomplished by operating the figure eight laser 11 in the correct wavelength range relative to the zero dispersion wavelength of the fiber forming the source components.

Since the figure eight laser 11 has no active modulation, it can produce pulses at any repetition rate desired that is an integer multiple of the round trip propagation time, which in turn is determined by the combined optical length of the optical loops 13 and 15.

The lens 26 of the feedback arm 27 couples light rejected from the nonlinear amplifying loop mirror (NALM) 18 and passed through ports 25C and 25D of the output coupler 25 to the feed-back arm 27 onto the mirror 28, such that that light is retroreflected into the end 30 of the optical fiber 32. The polarization controller 34 is provided to adjust the polarization of the retroreflected light to match that of the optical pulse oscillating in the cavity of the laser 11. The mirror 28 is provided with a longitudinal adjustment (represented by a double arrow 36), such as a translation stage (not shown), to vary the delay between the retroreflected pulse and the oscillating pulse in the figure eight laser 11. The combination of the lens 26 and mirror 28 can be replaced by a mirror (not shown) coated directly onto the face (not shown) of the end 30 of the optical fiber 32, or by butting the end 30 of the fiber 32 directly onto the mirror 28, or by using a Bragg grating written directly into the fiber 32. In such cases, the variable delay may be implemented by stretching the fiber 32 leading from the output coupler 25 to the reflective element that would be used. If all of the optical fibers in the figure eight laser 11 and in the feedback arm 27 were comprised of polarization preserving fiber, none of the polarization controllers 34, 35 and 37 would be needed.

The figure eight laser 11 generates pulses by way of passive mode locking induced by an artificial saturable absorber, comprised of a nonlinear Sagnac interferometer or loop mirror 15 constructed such that a phase difference is generated between the counter-propagating beams in proportion to their intensities. In a linear Sagnac interferometer, light is retroreflected along the input path through port 17A as the beams in both directions experience identical phase shifts on propagation. In a nonlinear Sagnac interferometer, the two counter-propagating beams accumulate an additional nonlinear phase in proportion to their intensities. If a phase difference of 180° is accumulated, all light will be transmitted through port 17D and through the optical isolator 19. As the phase difference is proportional to the input intensity, the transmission through the port 17D increases with increasing intensity. The figure eight laser 11 is constructed by connecting the port 17D through the optical osolator 19 to the port 25A of the output coupler 25.

Thus, at low intensities, as in a continuous wave case, all light is reflected by the Sagnac interferometer or loop mirror 15 through port 17A of beam splitter 17 and ports 25C and 25A of output coupler 25 and blocked by the isolator 19, preventing the laser 11 from lasing. However, at high intensities, the light input at the beam splitter 17 through port 17A into the loop 15 will be transmitted out the port 17D, through the isolator 19 to the port 25A of output coupler 25 to complete the circuit and thus allow lasing. The Sagnac interferometer or loop mirror 15 is constructed so that the required intensities for lasing cannot be supported continuously in the gain medium 21, and so the preferred regime of oscillation is pulsed.

The evolution of the mode-locked pulse can be described as follows. Initially, the light consists of a low-intensity, nearly-continuous wave background. Any sufficiently intense noise spike will see less loss and will initiate the formation of a pulse. On each round trip the most intense portions will be transmitted, while the least intense portions will not be transmitted. After many round trips, this will shape the noise spike into a short, well defined, steady state pulse.

To more readily understand the operation of the invention, the feedback arm 27 will be temporarily omitted from the following discussion.

The high intensity portions of the light from port 17D of the beam splitter 17 pass through the optical isolator 19 and through the polarization controller 35. Approximately 20% of this light passes through ports 25A and 25B as a 1563 nm output mode-locked pulse, with the wavelength being determined by the birefringent properties of the cavity of the laser 11.

If the pulse propagating around the cavity (comprised of the optical loops 13 and 15 and the beam splitter 17) of the laser 11 is not sufficient to utilize all of the power that the laser 11 wants to put out, on subsequent round trips through the laser 11 the laser 11 will form one or more additional pulses from noise spikes until a pulse number limit is reached for which no excess power is generated by the erbium-doped fiber or erbium fiber amplifier 21. This limit is determined by the size of each pulse, the length of the erbium fiber amplifier 21 and the saturation power of the erbium fiber amplifier 21. For purposes of the following discussion of the operation of the figure eight laser 11, assume that the conditions in the laser 11 are such that the gain of the erbium fiber amplifier 21 can support a total of four pulses propagating in the cavity of the laser 11.

The problem with the figure eight laser 11, without the feedback arm 27, is that the three additional pulses propagating in the figure eight laser 11 would usually form with arbitrary spacings around the cavity of the laser 11, leading to erratic reconfiguration of the pulse train.

The feedback structure or feedback arm 27 is important because it can be used to control the spacing of the pulses when the gain is sufficient to support more than one pulse per round trip. Without the feedback produced by the feedback arm 27, as indicated above, there would be no control of the pulse spacing or repetition rate, and no enhanced mode-locking. Any sufficiently large spike may evolve into a pulse, and such noise spikes are inherently randomly timed.

The feedback from the feedback arm 27 controls the spacing or timing of the pulses in the following manner. After formation of the first pulse, the central portion of the pulse is transmitted through the loop mirror 15. However, the low intensity wings of that first pulse are preferentially reflected back through the port 17A of the beam splitter 17 to the output coupler 25. A relatively large fraction (80%) of this rejected light is coupled through ports 25C and 25A and polarization controller 35 and blocked by the optical isolator 19. On the other hand, a relatively small fraction (20%) of this rejected light is coupled through the ports 25C and 25D of output coupler 25 to the feedback arm 27, and then retroreflected through ports 25D and 25C of the output coupler 25 and into the loop 13 of the laser 11 with some timing delay with respect to the oscillating initial pulse. This light fed back into the loop 13 of the laser cavity now serves as a new noise spike which initiates the formation of a second pulse. This operation may be repeated to generate additional pulses up to a limit determined by the power or energy which can be extracted from the gain of the laser 11. It should be noted that the timing is not interferometrically sensitive to the delay introduced by the feedback arm 27, since the feedback light is much less than the oscillating light and serves only as a seed for the initiation of a new pulse.

Figure 2A:
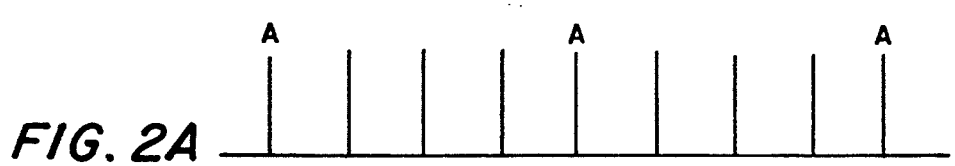
FIGS. 2A and 2B illustrate waveforms useful in understanding the operation of the invention of FIG. 1.
Figure 2B:
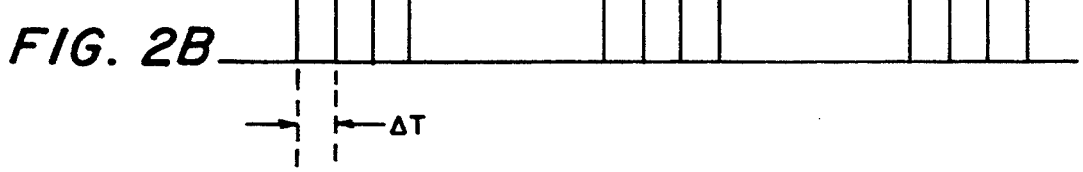

The positioning of the mirror 28 by means of the longitudinal adjustment 36 can vary the delay between the retroreflected pulse and the oscillating pulse A in the figure eight laser 11 to control when the four exemplary pulses will occur. Thus, the mirror 28 can be positioned to obtain a delay which, for example, produces four evenly spaced pulses at the output port 25B of the output coupler 25 to multiply the repetition rate by four, as shown in FIG. 2A. Similarly, the mirror 23 can be positioned to obtain a delay which, for example, produces at the output port 25B of the coupler 25 a short burst of four pulses, each pulse having an interpulse period of $\Delta T$, during each round trip around the cavity of the laser 11, as shown in FIG. 2B.

In the implementation of the figure eight laser 11 of FIG. 1, the figure eight laser 11 was constructed to have a short cavity length of 718 centimeters (cm) and a fundamental repetition rate of 28.54 MHz. The nonlinear amplifying loop mirror (NALM), which was comprised of the optical loop 15 and the beam splitter 17, included 250 cm of $SiO_2$-$Al_2O_3$-$P_2O_5$ fiber 33 that was doped with approximately 1200 ppm (parts per million) by weight with erbium.

In the operation of the figure eight laser 11, the fiber 33 was pumped through the WDM coupler 23 with 100–550 mW (milliwatts) at 980 nm from a CW Ti:Al$_2$O$_3$ laser (not shown). The total length of the optical loop 15 was about 440 cm. By adding the feedback mirror 28 and polarization controller 34 in the feedback arm 27, mode-locking could be initiated simply by translating the the feedback mirror 28 or manipulating the polarization contollers 34, 35 and 37, and the output pulses were shortened to 275 fs.

Therefore, what has been described in a preferred embodiment of the invention is an optical pulse generator for producing mode-locked optical pulses which comprises: a beam splitter; first and second optical loops coupled together by the beam splitter so as to define a figure eight optical path in which a light beam propagating toward the beam splitter in one of the first and second optical loops is split by the beam splitter to form two light beams propagating in opposite directions around the other one of the first and second optical loops; a direction dependent loss element disposed in the first optical loop for reducing the intensity of light propagating in a predetermined direction around the first optical loop; a nonlinear element disposed in the second optical loop and having an intensity dependent nonlinear optical transmission characteristic; an optical gain medium disposed in a selected one of the first and second optical loops; coupling apparatus for coupling pump light into the selected one of said first and second optical loops having the gain medium, and for coupling mode-locked optical pulses out of the optical pulse generator; and a feedback structure, coupled to the coupling apparatus, being responsive to light propagating therethrough for controlling the repetition rate of the mode-locked optical pulses.

It should therefore readily be understood that many modifications and variations of the present invention are possible within the purview of the claimed invention. For example, although the optical pulse generator 11 of FIG. 1 is shown and described as an all-fiber optical pulse generator, the optical pulse generator of the invention could also have been implemented with bulk elements within the purview of the invention; the gain medium 21 could have comprised a length of optical fiber doped with any other suitable rare earth; and the gain medium 21 and/or the WDM coupler 23 could have been disposed in the optical loop 13 instead of the optical loop 15. It is therefore to be understood that, within the scope of the appended claims, the invention may be practiced otherwise than as specifically described.

What is claimed and desired to be secured by Letters Patent of the United States is:

1. An optical pulse generator laser for producing mode-locked optical pulses, said optical pulse generator laser having a cavity comprising:

a beam splitter;

first and second optical loops coupled together by said beam splitter so as to define a figure eight optical path in which a light beam propagating toward said beam splitter in one of said first and second optical loops is split by said beam splitter to form two light beams propagating in opposite directions around the other one of said first and second optical loops;

direction dependent loss means disposed in said first optical loop for reducing the intensity of light propagating in a predetermined direction around said first optical loop;

nonlinear means disposed in said second optical loop and having an intensity dependent nonlinear optical transmission characteristic;

an optical gain medium disposed in a selected one of said first and second optical loops;

means for coupling pump light into said selected one of said first and second optical loops having said gain medium, and for coupling mode-locked optical pulses out of said optical pulse generator laser, said coupling means including:

a fiber wavelength division multiplexer coupler for coupling pump light into said selected one of said first and second optical loops having said gain medium; and an output coupler having first and second ports internal to said cavity and third and fourth ports external to said cavity, said output coupler being disposed in said first optical loop for coupling mode-locked optical pulses out of said optical pulse generator laser, said first port being coupled to said direction dependent loss means to enable a first portion of mode-locked optical pulses to pass through said second port to said beam splitter and a second portion of mode-locked optical pulses to be coupled through said third port and out of said optical pulse generator laser, said second port being responsive to light from said beam splitter for enabling that light to pass through said fourth port; and feedback means having a variable delay, coupled to said fourth port of said coupling means, being responsive to light from said fourth port for providing feedback of that light propagating therethrough in a manner which is not interferometrically sensitive, for controlling the repetition rate of said mode-locked optical pulses.

2. The optical pulse generator laser of claim 1 wherein:

said gain medium is in said second optical loop;

said fiber wavelength division multiplexer coupler couples pump light into said second optical loop; and said output coupler is disposed in said first optical loop.

3. The optical pulse generator laser of claim 1 wherein:

said gain medium is in said first optical loop; and said fiber wavelength division multiplexer coupler couples pump light into said first optical loop.

4. The optical pulse generator laser of claim 1 wherein said feedback means includes:

a feedback mirror;

a lens for coupling light from said output coupler to said feedback mirror and for coupling light reflected from said feedback mirror back into said first optical loop.

5. The optical pulse generator laser of claim 4, wherein:

said lens is a gradient index lens.

6. The optical pulse generator laser of claim 4 wherein said feedback means further includes:

a polarization controller disposed between said lens and said output coupler for adjusting the polarization state of the light reflected from said feedback mirror.

7. The optical pulse generator laser of claim 4 wherein:

said feedback mirror, said lens and said output coupler are disposed along an optical path; and said feedback mirror is adjustable along said optical path to control the repetition rate of said mode-locked optical pulses.

8. The optical pulse generator laser of claim 4 further including:

first and second polarization controllers respectively disposed in said first and second optical loops for adjusting the polarization states of the light in said first and second optical loops to enable the optical pulse generator to produce optical pulses.

9. The optical pulse generator laser of claim 8 further including:

a third polarization controller disposed between said lens and said output coupler for adjusting the polarization state of the light reflected from said feedback mirror.

10. The optical pulse generator laser of claim 4 wherein:
said optical pulse generator further includes means for adjusting the linear phase offset of counter-propagating light in said second optical loop.

11. The optical pulse generator laser of claim 10 wherein:
said adjusting means is a polarization controller in said second optical loop.

12. The optical pulse generator laser of claim 11 wherein:
said gain medium is disposed in said second optical loop and is comprised of a rare earth doped single-mode optical fiber;
said first optical loop comprises non-polarization preserving fiber; and
a second polarization controller disposed in said first optical loop for compensating the polarization of the light beam entering said beam splitter from said first optical loop.

13. The optical pulse generator laser of claim 12 further including:
a third polarization controller disposed between said lens and said output coupler for adjusting the polarization state of the light reflected from said feedback mirror.

14. The optical pulse generator laser of claim 1 wherein:
said gain medium is in said first optical loop.

15. The optical pulse generator laser of claim 14 wherein:
said gain medium is a rare earth doped single-mode optical fiber.

16. The optical pulse generator laser of claim 15 wherein:
said rare earth is erbium.

17. The optical pulse generator laser of claim 1 wherein:
said direction dependent loss means is an optical isolator.

18. The optical pulse generator laser of claim 1 wherein:
said gain medium is in said second optical loop.

19. The optical pulse generator laser of claim 18 wherein:
said gain medium is a rare earth doped single-mode optical fiber.

20. The optical pulse generator laser of claim 19 wherein:
said rare earth is erbium.

21. The optical pulse generator laser of claim 19 wherein:
said nonlinear means comprises an optical fiber forming part of said second optical loop; and
said beam splitter has a reflectivity ratio of 50:50 such that said second optical loop operates as a nonlinear amplifying loop mirror.

22. The optical pulse generator laser of claim 18 wherein:
said direction dependent loss means is an optical isolator.

23. An optical pulse generator for producing mode-locked optical pulses, said optical pulse generator comprising:
a beam splitter;
first and second optical loops coupled together by said beam splitter so as to define a figure eight optical path in which a light beam propagating toward said beam splitter in one of said first and second optical loops is split by said beam splitter to form two light beams propagating in opposite directions around the other one of said first and second optical loops;
direction dependent loss means disposed in said first optical loop for reducing the intensity of light propagating in a predetermined direction around said first optical loop;
nonlinear means disposed in said second optical loop and having an intensity dependent nonlinear optical transmission characteristic;
an optical gain medium disposed in a selected one of said first and second optical loops;
means for coupling pump light into said selected one of said first and second optical loops having said gain medium, and for coupling mode-locked optical pulses out of said optical pulse generator, said coupling means including:
a fiber wavelength division multiplexer coupler for coupling pump light into said selected one of said first and second optical loops having said gain medium; and
an output coupler disposed in the other one of said first and second optical loops and adjacent to said beam splitter for coupling mode-locked optical pulses out of said optical pulse generator; and
feedback means, coupled to said coupling means, being responsive to light propagating therethrough for controlling the repetition rate of said mode-locked optical pulses, said feedback means including:
an optical fiber coupled at a first end to said output coupler for passing light from said output coupler therethrough, said optical fiber having a second end having a face;
a mirror coated onto said face for reflecting light from said output coupler back through said optical fiber and said output coupler into said other one of said first and second optical loops; and
means for stretching said optical fiber to produce a desired delay of the light in said optical fiber.

24. An optical pulse generator for producing mode-locked optical pulses, said optical pulse generator comprising:
a beam splitter;
first and second optical loops coupled together by said beam splitter so as to define a figure eight optical path in which a light beam propagating toward said beam splitter in one of said first and second optical loops is split by said beam splitter to form two light beams propagating in opposite directions around the other one of said first and second optical loops;
direction dependent loss means disposed in said first optical loop for reducing the intensity of light propagating in a predetermined direction around said first optical loop;
nonlinear means disposed in said second optical loop and having an intensity dependent nonlinear optical transmission characteristic;
an optical gain medium disposed in a selected one of said first and second optical loops;

means for coupling pump light into said selected one of said first and second optical loops having said gain medium, and for coupling mode-locked optical pulses out of said optical pulse generator, said coupling means including:
a fiber wavelength division multiplexer coupler for coupling pump light into said selected one of said first and second optical loops having said gain medium; and
an output coupler disposed in the other one of said first and second optical loops and adjacent to said beam splitter for coupling mode-locked optical pulses out of said optical pulse generator; and
feedback means, coupled to said coupling means, being responsive to light propagating therethrough for controlling the repetition rate of said mode-locked optical pulses, said feedback means including:
an optical fiber coupled at a first end to said output coupler for passing light from said output coupler therethrough, said optical fiber having a second end;
a mirror butt-coupled to said second end for reflecting light from said output coupler back through said optical fiber and said output coupler into said other one of said first and second optical loops; and
means for stretching said optical fiber to produce a desired delay of the light in said optical fiber.

25. An optical pulse generator for producing mode-locked optical pulses, said optical pulse generator comprising:
a beam splitter;
first and second optical loops coupled together by said beam splitter so as to define a figure eight optical path in which a light beam propagating toward said beam splitter in one of said first and second optical loops is split by said beam splitter to form two light beams propagating in opposite directions around the other one of said first and second optical loops;
direction dependent loss means disposed in said first optical loop for reducing the intensity of light propagating in a predetermined direction around said first optical loop;
nonlinear means disposed in said second optical loop and having an intensity dependent nonlinear optical transmission characteristic;
an optical gain medium disposed in a selected one of said first and second optical loops;
means for coupling pump light into said selected one of said first and second optical loops having said gain medium, and for coupling mode-locked optical pulses out of said optical pulse generator, said coupling means including:
a fiber wavelength division multiplexer coupler for coupling pump light into said selected one of said first and second optical loops having said gain medium; and
an output coupler disposed in the other one of said first and second optical loops and adjacent to said beam splitter for coupling mode-locked optical pulses out of said optical pulse generator; and
feedback means, coupled to said coupling means, being responsive to light propagating therethrough for controlling the repetition rate of said mode-locked optical pulses, said feedback means including:
an optical fiber coupled to said output coupler for passing light from said output coupler therethrough;
a Bragg grating written directly into said optical fiber for reflecting light from said output coupler back through said optical fiber and said output coupler; into said other one of said first and second optical loops; and
means for stretching said optical fiber to produce a desired delay of the light in said optical fiber.

* * * * *